(12) United States Patent  
Ulchak et al.

(10) Patent No.: US 9,221,611 B2  
(45) Date of Patent: Dec. 29, 2015

(54) VARIABLE SPACED CONVEYOR BELT WITH SHORTENED EDGE LINK CUT-OFF

(71) Applicant: CAMBRIDGE INTERNATIONAL INC., Cambridge, MD (US)

(72) Inventors: Jeffrey D. Ulchak, Salisbury, MD (US); Michael R. Franzoni, Cumberland, RI (US)

(73) Assignee: CAMBRIDGE INTERNATIONAL INC., Cambridge, MD (US)

( * ) Notice: Subject to any disclaimer, the term of this patent is extended or adjusted under 35 U.S.C. 154(b) by 0 days.

(21) Appl. No.: 14/580,855

(22) Filed: Dec. 23, 2014

(65) Prior Publication Data

US 2015/0191312 A1 Jul. 9, 2015

Related U.S. Application Data

(60) Provisional application No. 61/922,423, filed on Dec. 31, 2013.

(51) Int. Cl.
*B65G 17/08* (2006.01)
(52) U.S. Cl.
CPC ................... *B65G 17/083* (2013.01)
(58) Field of Classification Search
CPC .............. B65G 17/083; B65G 17/08
See application file for complete search history.

(56) References Cited

U.S. PATENT DOCUMENTS

| 4,846,339 | A  | * | 7/1989 | Roinestad | B65G 17/086 198/852 |
| 5,950,807 | A  | * | 9/1999 | Greer | B65G 15/54 198/848 |
| 7,494,005 | B2 | * | 2/2009 | Messick, Jr. | B65G 17/064 198/848 |
| 7,975,840 | B2 | * | 7/2011 | Messick, Jr. | B65G 23/06 198/834 |
| 8,752,698 | B2 | * | 6/2014 | Lasecki | B65G 17/064 198/851 |
| 9,061,829 | B2 | * | 6/2015 | Salsone | B65G 15/30 |
| 2013/0092513 | A1 | * | 4/2013 | Record | B65G 17/083 198/853 |

\* cited by examiner

*Primary Examiner* — Gene Crawford
*Assistant Examiner* — Thomas Randazzo
(74) *Attorney, Agent, or Firm* — Buchanan Ingersoll & Rooney PC

(57) ABSTRACT

A flat wire conveyor belt includes a plurality of spaced tractive rods, a plurality of rows of flat wire pickets transversely disposed and interconnecting the plurality of spaced tractive rods, each picket defining a nominal picket height; each of the rows of pickets defines a plurality of first links and a plurality of second links, and each of the links having a transverse spacing. The conveyor belt includes opposing first and second outer edges and the plurality of first links are disposed on at least one of the first and second outer edges of the flat wire conveyor belt. The first links on at least one of the first and second outer edges having a terminal end with a reduced length less than the nominal picket height.

11 Claims, 11 Drawing Sheets

VARIABLE SPACED CONVEYOR BELT WITH SHORTENED EDGE LINK CUT-OFF

TECHNICAL FIELD

The disclosure herein is directed to a conveyor belt, more particularly to a flat wire conveyor belt having variable spaced wire links, and still more particularly, to a flat wire conveyor belt having at least one shortened edge link.

BACKGROUND

With reference to FIG. 1, a conventional flat wire conveyor belt 10 is used in a spiral system or turn application, and tension is carried on the outer edge 12 of belt 10 by reinforcing side bars 14. The pickets 16 on belt 10 are generally for product support and the rods 18 are utilized to hold the components of belt 10 together, and to transmit drive forces to the outside edge 12 of belt 10. As shown in FIG. 2, the terminal ends 20, 22 of each picket 16 is equal to or extends past the nominal picket height and include two slots 24 for receiving the rods 18. An example of such a flat wire conveyor belt is provided in U.S. Pat. No. 7,494,005, assigned to Cambridge International, Inc., the entire contents of which are hereby incorporated by reference.

While the conveyor belt of the '005 patent exhibits outstanding performance and has enjoyed substantial commercial success, the length of the terminal ends on the pickets has limited its use in extremely tight radius turn belts, especially if it is also desired to have a reinforcing side bar on the inner edge of the conveyor belt.

SUMMARY

An exemplary embodiment of the disclosure herein is directed to a flat wire conveyor belt comprising a plurality of spaced tractive rods; a plurality of rows of flat wire pickets transversely disposed with respect to a direction of travel and interconnecting said plurality of spaced tractive rods, each said picket defining a nominal picket height; each of said rows of pickets defining a plurality of first links and a plurality of second links, each of said links having a transverse spacing; wherein said plurality of first links have a first transverse spacing and said plurality of second links have a second transverse spacing, said first spacing being less than said second spacing, and wherein said conveyor belt includes opposing first and second outer edges and said plurality of first links are disposed on at least one of the first and second outer edges of the flat wire conveyor belt, said first links on said at least one of the first and second outer edges having a terminal end with a reduced height less than the nominal picket height.

BRIEF DESCRIPTION OF THE DRAWING FIGURES

These and other features, and advantages of the disclosure will become more readily apparent to those skilled in the art upon reading the following detailed description, in conjunction with the appended drawings in which.

DETAILED DESCRIPTION

Figure 3:
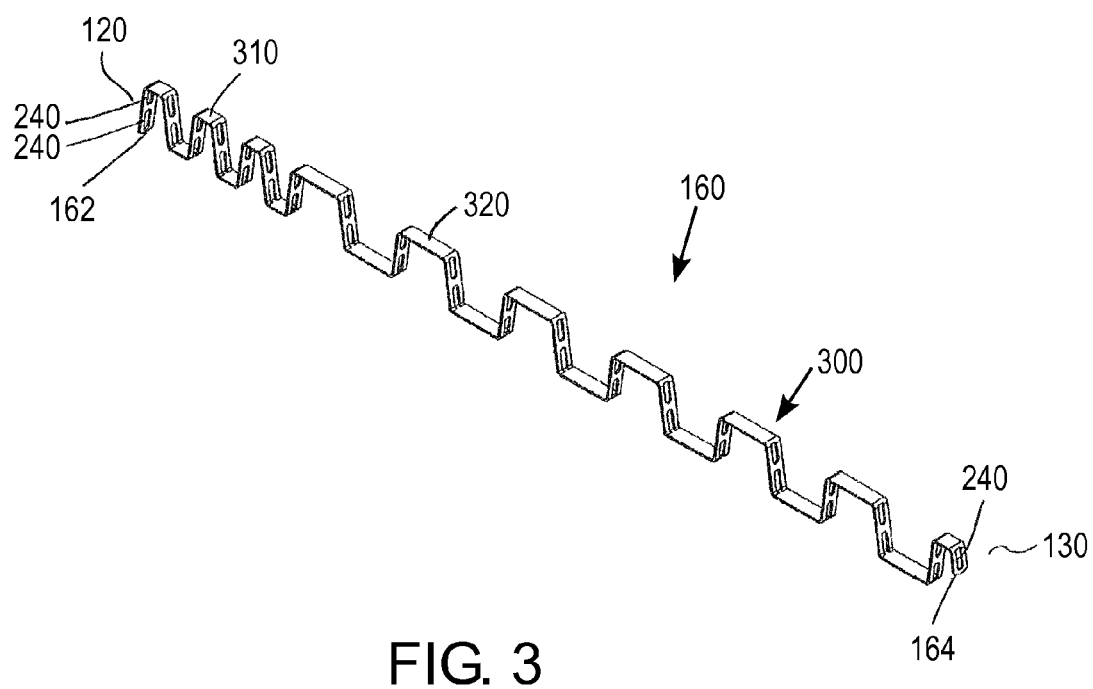
FIG. 3 is a perspective view of an exemplary embodiment of a single picket according to the disclosure herein.
Figure 4:
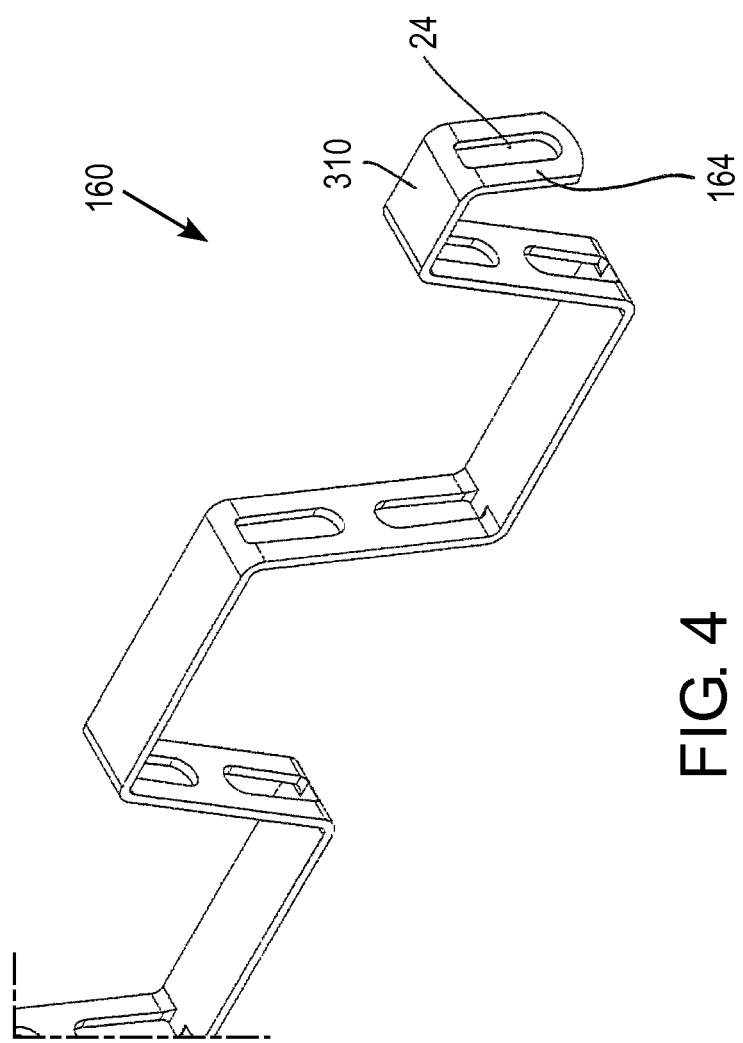
FIG. 4 is an enlarged partial perspective view of the single picket shown in FIG. 3.
Figure 5:
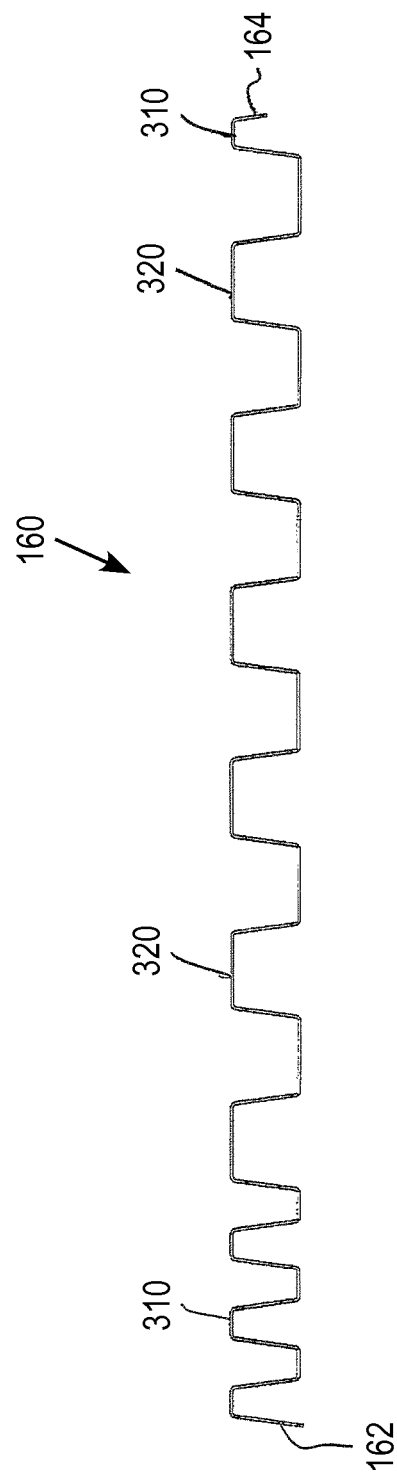
FIG. 5 is a side elevational view of the single picket shown in FIG. 3.
Figure 6:
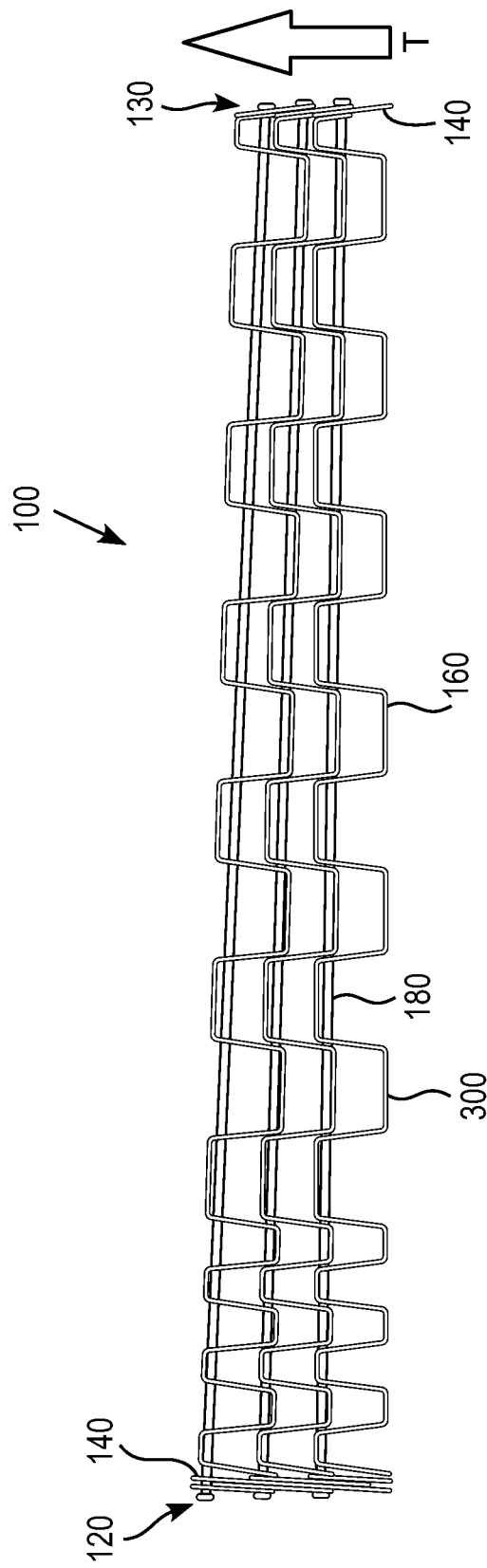
FIG. 6 is a side elevational view of an exemplary embodiment of a conveyor belt including the single picket shown in FIG. 3.
Figure 7:
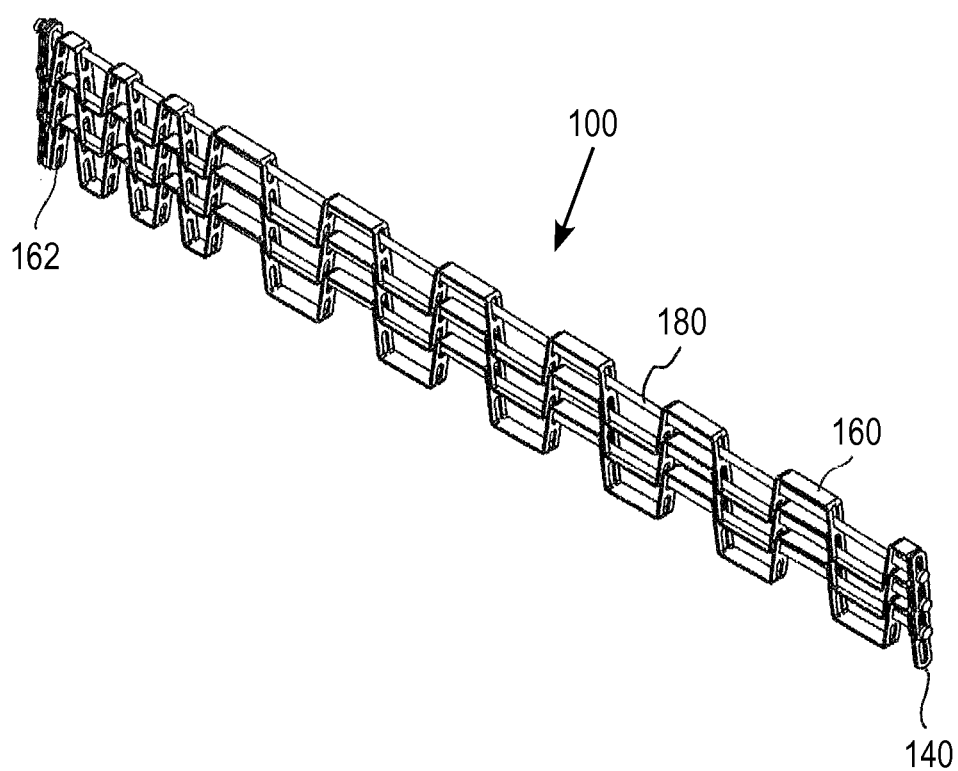
FIG. 7 is a perspective view of the conveyor belt shown in FIG. 6.
Figure 8:
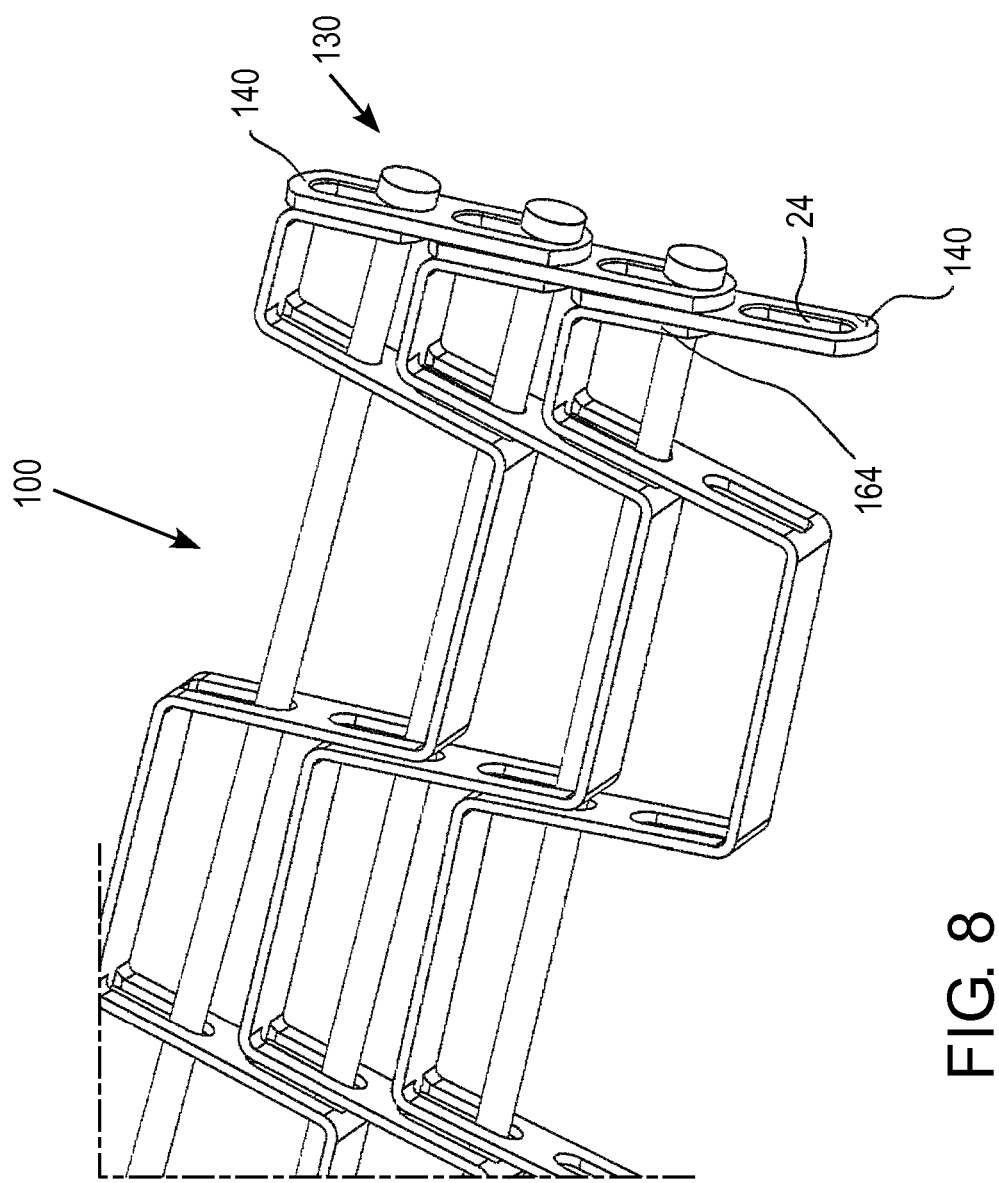
FIG. 8 is an enlarged partial perspective view of the conveyor belt shown in FIG. 6.

A conveyor belt in accordance with an exemplary embodiment of the disclosure herein is shown generally in FIGS. 6-8 by reference numeral 100, and a single picket incorporated in the conveyor belt 100 is shown generally in FIGS. 3-5 by reference numeral 160.

In accordance with a first exemplary embodiment, pickets 160 comprise a plurality of links 300; however, not all the links 300 within a single picket are identical. More particularly, in order to strengthen the outer tension-receiving edge or edges of the conveyor belt, the edges 120, 130 of the picket may be provided with links 310 having a first spacing or mesh size and the middle portion of the belt therebetween is provided with links 320 having a second spacing or mesh size. The exact number of links 310 or mesh openings on one or both ends of the picket may vary depending upon the weight of the belt and other conditions. In a preferred embodiment, the spacing of the links 310 on both edges is less than the spacing of the links 320 such that the edges of the conveyor belt are denser, heavier, and/or stronger, and thus able to withstand the tension applied thereto without fatigue.

Figure 1:
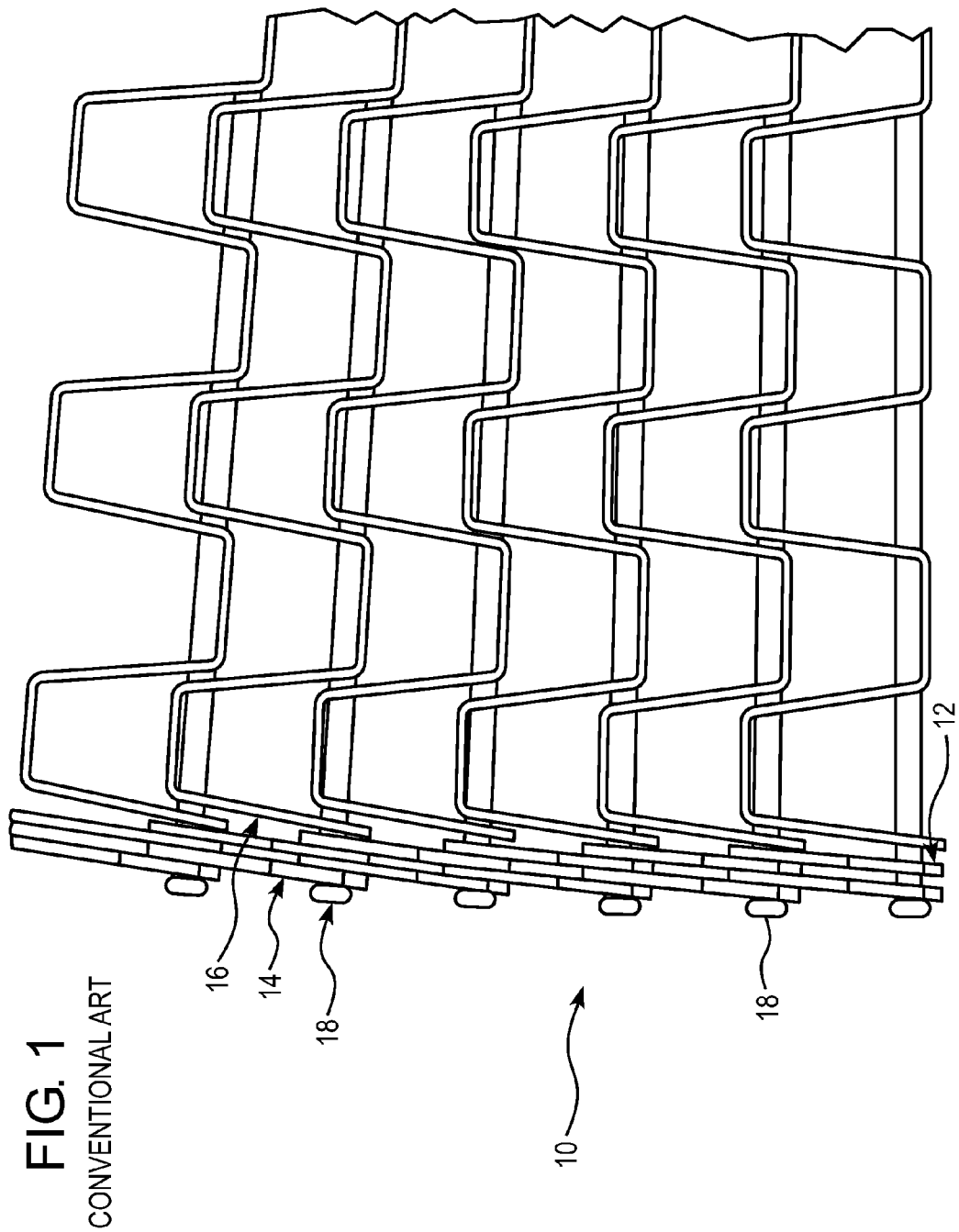
FIG. 1 is a top elevational view, partly schematic and with portions broken away, of a segment of a conventional flat wire conveyor belt.
Figure 2:
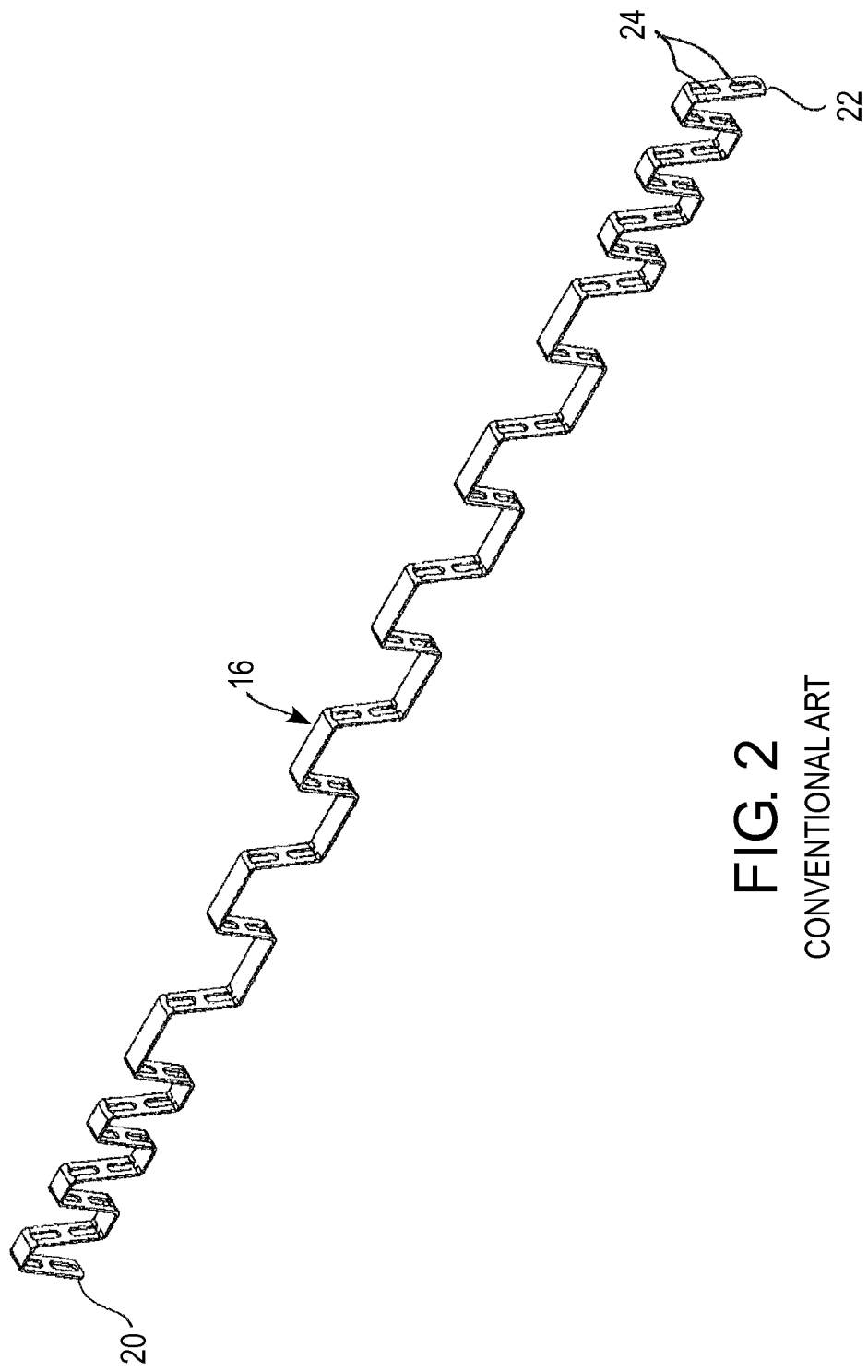
FIG. 2 is a top elevational view of a single picket in the flat wire conveyor belt shown in FIG. 1.

The picket 160 according the disclosure herein differs from the conventional picket 16 shown in FIGS. 1 and 2 in that on at least one edge 130 of the picket 160, the terminal end 164 has a reduced length, i.e., it is cut-off shorter, and it contains only one slot 240 for receiving a connecting rod 180 and does not extend past the nominal height of the picket 160. The other edge 120 of the picket 160 may have a terminal end 162 of conventional length equal to or greater than the nominal height of the picket 160 and include two slots 240, or may also be of a reduced length as discussed further below.

As shown in FIG. 6, belt 100 includes a plurality of rows of pickets 160 transversely disposed with respect to the direction of travel T. Each row of pickets 160 is comprised of a plurality of links 300, each link connecting a rod 180 with a following rod in the succession. In addition, belt 100 preferably includes at least one row of reinforcing bars 140 disposed along each edge 120, 130 of the conveyor belt. Belt 100 may be manufactured, however, with reinforcing bars on only one edge, without any reinforcing bars or alternatively, several rows of reinforcing bars may be provided, depending upon the particular application. Each edge 120, 130 of the belt also includes a retention mechanism (such as button-heading, clinching, etc.) to retain all the components in proper position.

Conveyor belt 100 has a transport course preferably including at least one course turn, either a left course turn or a right course turn. When belt 100 is in a right course turn (relative to the figure as shown), belt 100 has outside edge 120 and inside edge 130. Belt 100 also has a straight transport course, also exemplified by arrow T, which is generally downstream of a left or right course turn of belt 100. In accordance with the disclosure herein, the terminal end 164 having the reduced cut-off length is to be oriented on the inside edge 130 of the turn about which the belt 100 is negotiating. The reduced cut-off length of the terminal end 164 allows the inside edge 130 of the belt 100 to collapse and negotiate extremely tight turns, while still having clearance to accept a reinforcing side bar 140 on the inner edge 130.

Heretofore, the use of an inner edge reinforcing side bar has not been possible in tight radius belts having the conventional full-length terminal end on the picket. The additional clearance achieved with the reduced cut-off length of the terminal end 164 in accordance with the disclosure herein makes it possible to provide at least one reinforcing side bar 140 on the inner edge 130 of a tight turn belt. The inner edge side bar is advantageous for maintaining an equal pitch between the inside and outside edges of the belt, which is an important factor to control and track the belt through straight-run sections. Additionally the inclusion of a reinforcing side bar on the inside edge of the belt allows conveyor belt 100 to be run in the traditional forward direction without issues of the cut-off becoming caught and/or otherwise damaged.

Figure 9:
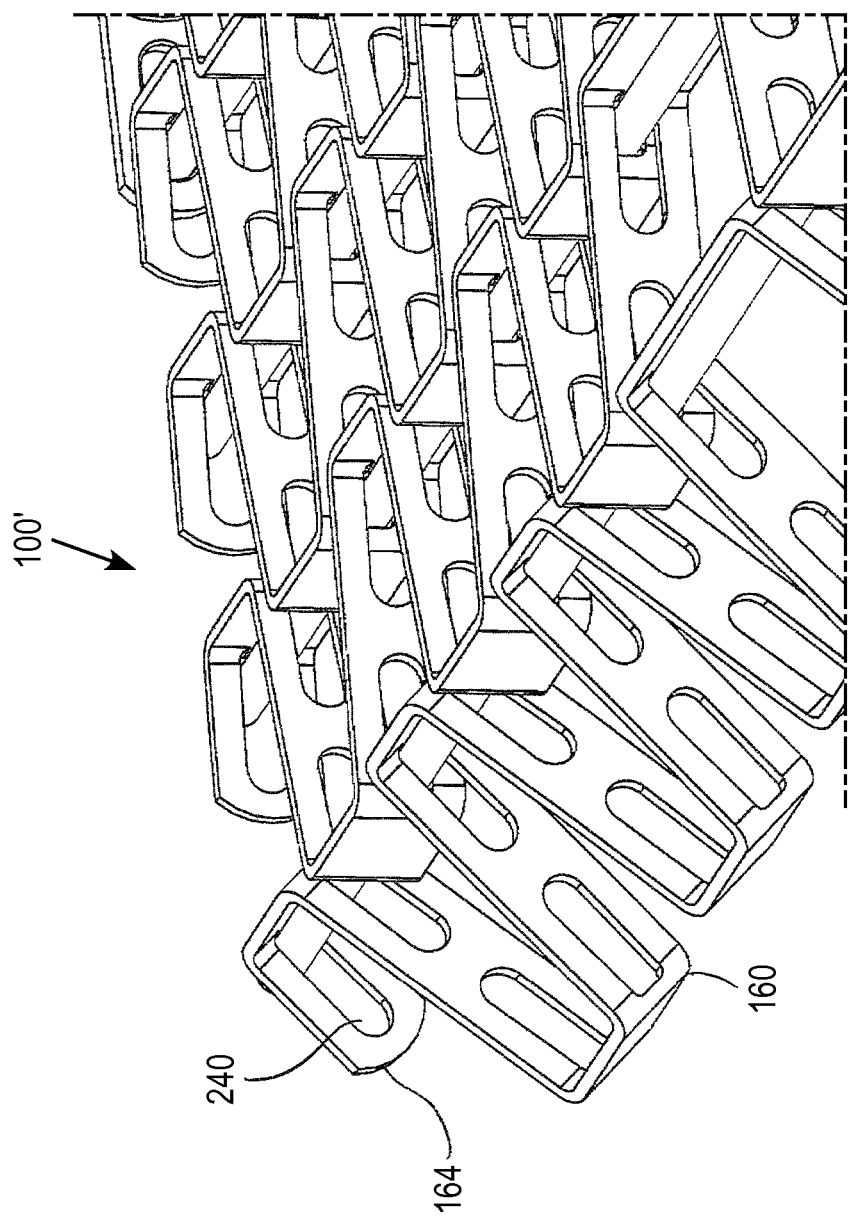
FIG. 9 is a perspective view of a further exemplary embodiment of a conveyor belt including the single picket shown in FIG. 3, in an articulated position.

Referring to FIG. 9, a further exemplary embodiment of a conveyor belt 100' is illustrated wherein the reinforcing side bar is removed for clarity. In the illustrated articulated state, it is shown that by eliminating the extension of the terminal end 164 past the nominal picket height, interference with adjacent rows of pickets can be avoided. The industry standard of flat wire belts having a cut-off terminal end which extends past the nominal picket height results in the end of the cut-off protruding beyond the plane of the preceding picket's top face during articulation of the belt, and causing an interference for product riding atop the belt, which can cause damage to product and result in problematic transfers. The exemplary embodiments of conveyor belts disclosed herein alleviate this issue by eliminating extension of the terminal end(s) past the nominal picket height, thereby creating a more even carrying surface, smoother transfers and minimized damage to product, as shown during articulation of the belt in FIG. 9.

Figure 10:
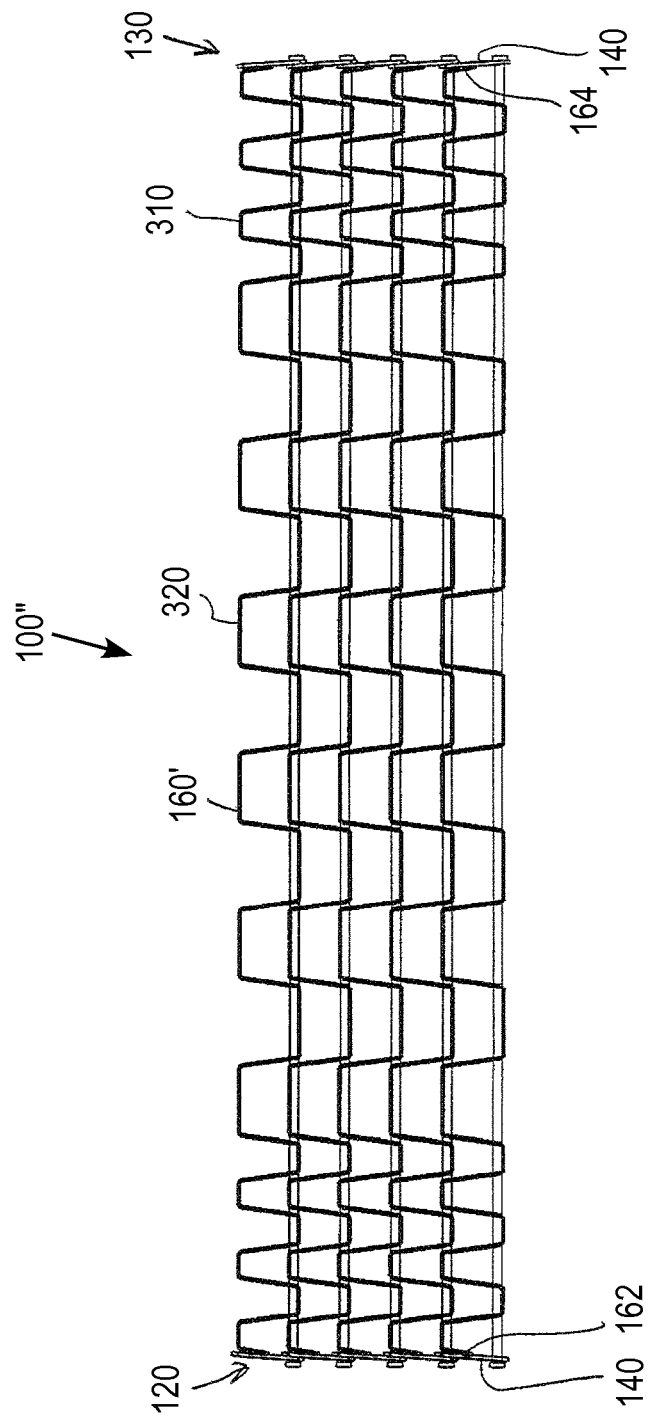
FIG. 10 is a side elevational view of a further exemplary embodiment of a conveyor belt according to the disclosure herein.
Figure 11:
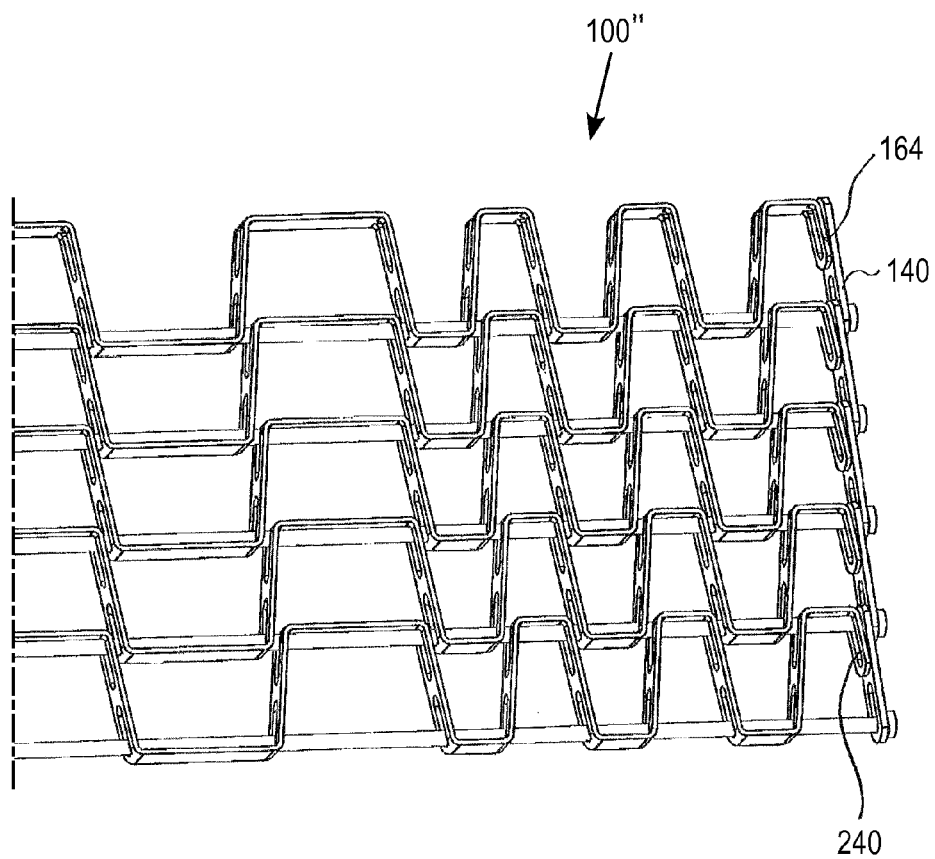
FIG. 11 is an enlarged perspective view of the conveyor belt shown in FIG. 10.

FIGS. 10 and 11 are directed to a further exemplary embodiment of conveyor belt 100". Traditionally, flat wire conveyor belts used in turn applications have inside edges which differ from the outside edge due to the necessity for the inside edge to be collapsible and the outside edge to carry tension, thereby eliminating the possibility of being able to flip the conveyor belt. Conveyor belt 100" includes pickets 160' wherein the terminal end 164 along one edge 130 of the picket 160' has a reduced length, i.e., it is cut-off shorter, and it contains only one slot 240 for receiving the connecting rod 180 and does not extend past the nominal height of the picket 160'. In addition, the other edge 120 of the picket 160' has a terminal end 162 along edge 120 of the picket 160' which also has a reduced length, i.e., it is cut-off shorter, and it contains only one slot 240 for receiving the connecting rod 180 and does not extend past the nominal height of the picket 160'. With this configuration, shortened cut-offs on both terminal ends 162, 164 on both the inside and outside edges 120, 130 of the picket, paired with symmetric tension-bearing reinforcing side bars and picket patterns on both edges of the conveyor belt, produces a turn conveyor belt 100" which can be flipped (i.e., rotated 180 degrees about the y-axis) to thereby substantially increase the belt life. Flipping the belt 100" allows the user to distribute the tension loading between the two edges of the belt, thereby equalizing elongation of the two edges and maximizing overall belt life. FIGS. 10 and 11 illustrate a symmetric pattern in which an equal number of narrower links 310 flank either side of a number of wider links 320, but the specific number of links could of course vary depending upon the application.

An exemplary variable spaced flat wire conveyor belt is illustrated herein; however, one skilled in the art will appreciate that use of a shortened terminal end on at least one edge link could also be applied to a balanced flat wire conveyor belt, i.e., one having all the links with a substantially similar spacing.

While the present invention has been described with respect to particular exemplary embodiments of the disclosure, this is by way of illustration rather than to confine the invention to any specific arrangement as there are various alterations, changes, deviations, eliminations, substitutions, omissions and departures which may be made in the particular embodiment shown and described without departing from the scope of the claims.

What is claimed is:

1. A flat wire conveyor belt comprising:
a plurality of spaced tractive rods;
a plurality of rows of flat wire pickets transversely disposed with respect to a direction of travel and interconnecting said plurality of spaced tractive rods, each said picket defining a nominal picket height;
each of said rows of pickets defining a plurality of first links and a plurality of second links, each of said links having a transverse spacing and at least one rod slot for receiving one of the plurality of spaced tractive rods therethrough;
wherein said plurality of first links have a first transverse spacing and said plurality of second links have a second transverse spacing, said first spacing being less than said second spacing, and
wherein said conveyor belt includes opposing first and second outer edges and said plurality of first links are disposed on at least one of the first and second outer edges of the flat wire conveyor belt, said first links on said at least one of the first and second outer edges having a terminal end with a reduced length less than the nominal picket height.

2. The conveyor belt of claim 1, wherein said plurality of first links are disposed on both said opposing first and second outer edges of the conveyor belt and said plurality of second links are disposed therebetween, said first links on both the first and second outer edges having terminal ends with a reduced length less than the nominal picket height.

3. The conveyor belt of claim 1, wherein said first links on another of said at least one of the first and second outer edges has a terminal end with a length greater than or equal to the nominal picket height.

4. The conveyor belt of claim 1, wherein each of said links is defined by a first link leg and a second link leg, said first links having said terminal end with the reduced length on said first link leg including only one rod slot on the first link leg and two rod slots on the second link leg.

5. The conveyor belt of claim 4, wherein said second links include two rod slots on the first link leg and two rod slots on the second link leg.

6. The conveyor belt of claim 1, further comprising at least one row of reinforcing bars disposed along at least one of said opposing first and second outer edges.

7. The conveyor belt of claim 6, wherein said at least one row of reinforcing bars is disposed along said at least one outer edge having the terminal end with the reduced length.

8. The conveyor belt of claim 2, wherein each of said links is defined by a first link leg and a second link leg, said first links having said terminal end with the reduced length on said first link leg including only one rod slot on the first link leg and two rod slots on the second link leg.

9. The conveyor belt of claim 8, wherein said second links include two rod slots on the first link leg and two rod slots on the second link leg.

10. The conveyor belt of claim 2, further comprising at least one row of reinforcing bars disposed along both said opposing first and second outer edges.

11. The conveyor belt of claim 10, wherein said at least one row of reinforcing bars is disposed along said first outer edge and said second outer edge having the terminal end with the reduced length.

* * * * *